US004001568B2

United States Statutory Invention Registration [19]

[11] Reg. Number: H1568

Huang et al.

[45] Published: Aug. 6, 1996

[54] ACOUSTIC SEPARATION OF LIQUID HYDROCARBONS FROM WASTEWATER

[75] Inventors: Pin Y. Huang, Bellaire; Yuh-Hwang Tsao, Houston, both of Tex.

[73] Assignee: Exxon Production Research Company, Houston, Tex.

[21] Appl. No.: 249,823

[22] Filed: May 26, 1994

[51] Int. Cl.[6] ..... C02F 1/48

[52] U.S. Cl. ..... 210/748; 210/702; 210/704; 210/708; 210/767

[58] Field of Search ..... 210/702, 704, 210/708, 748, 767

[56] References Cited

U.S. PATENT DOCUMENTS

| | | | |
|---|---|---|---|
| 2,257,997 | 10/1941 | Barnes | 210/748 |
| 4,308,006 | 12/1981 | Koblanski | 210/748 |
| 4,339,247 | 7/1982 | Faulkner et al. | 210/748 |
| 4,483,695 | 11/1984 | Covey, Jr. | 210/748 |
| 4,556,467 | 12/1985 | Kuhn et al. | 210/748 |
| 5,006,266 | 4/1991 | Schram | 210/748 |
| 5,085,783 | 2/1992 | Feke et al. | 210/748 |
| 5,192,450 | 3/1993 | Heyman | 210/748 |
| 5,225,089 | 7/1993 | Benes et al. | 210/748 |

OTHER PUBLICATIONS

Apfel, R. E.; "Acoustic Radiation Pressure—Principles and Applications to Separation Science"; *Forstschritte der Akustick;* DAGA; pp. 19–35, 1990.

Tolt, T. L. & Feke, D. L.; "Separation of Dispersed Phases From Liquids in Acoustically Driven Chambers"; Chemical Engineering Science, vol. 48, No. 3, pp. 527–540, 1993.

Marston, P. L. & Apfel, R. E.; "Acoustically Forced Shape Oscillation of Hydrocarbon Drops Levitated in Water"; Journal of Colloid and Interface Science, vol. 68, No. 2, pp. 280–286, Feb. 1979.

Crum, L. A.; "Bjerknes Forces on Bubbles in a Stationary Sound Field"; J. Acoust. Soc. Am., vol. 57, No. 6, Part 1, pp. 1363–1370, Jun. 1975.

Crum, L. A.; "Acoustic Force on a Liquid Droplet in an Acoustic Stationary Wave"; The Journal of the Acoustical Society of America, pp. 157–163, Feb. 8, 1971.

Beard, R., Senapati, N. and Muralidhara, H. S.; "Ultrasonic Interactions in Electro Acoustic Dewatering"; British Sugar plc–Technical Conference, Eastbourne, pp. 1–37, 1988.

*Primary Examiner*—Charles T. Jordan
*Assistant Examiner*—Meena Chelliah

[57] ABSTRACT

A process for separating liquid hydrocarbons from a wastewater using acoustic energy below cavitation is disclosed. The wastewater containing the residual hydrocarbons is introduced into a vessel which has at least two groups of acoustic transducers attached to it. Acoustic energy is applied to the fluid at an intensity below cavitation level and sufficient to induce at least one standing wave in the fluid. The liquid hydrocarbons are allowed to coalesce within the vessel to a coalesced droplet size of about 20 microns. These coalesced hydrocarbons are then separated from the wastewater.

10 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACOUSTIC SEPARATION OF LIQUID HYDROCARBONS FROM WASTEWATER

FIELD OF THE INVENTION

The invention relates generally to a process for separating hydrocarbons from wastewater using acoustic energy. More specifically, but not by way of limitation, the invention relates to a process for separating hydrocarbons from wastewater by introducing a continuous flow of wastewater into a vessel which has been retrofitted with at least two groups of acoustic transducers and applying acoustic energy to the fluid at an intensity below cavitation level, sufficient to induce at least one standing wave within the fluid, whereby the liquid hydrocarbons coalesce to a large enough size that they can then be separated from the fluid using conventional separation equipment.

BACKGROUND OF THE INVENTION

In oil and gas producing operations, as produced fluid is delivered to the surface from the well, the fluid must be treated at the site to separate the crude oil and natural gas from the other fluids prior to their entry into the pipeline system. Basic sediment and water, which are initially present in the produced fluid in varied quantities, are considered by-products and impurities in produced petroleum. In addition to containing basic sediment and water, recovered petroleum is a complex mixture of many different compounds of hydrocarbons, all with different densities, pressures and characteristics which vary from well to well. This is further complicated as hydrocarbons are mixed in varied combinations with other fluids and sediment. As a result, the produced fluid from each well will have its own characteristics which determine the specific type of treating facilities that will be required to remove any by-products and impurities.

FIG. 1 illustrates the different types of equipment used in a representative field processing system. The produced fluid from the wellhead 1 flows into a separator 2 for the first stage of separation. These horizontal or vertical separators 2 are used to separate gases from liquids. Additional first stage separator units include freewater knockout units and settling tanks, which take advantage of the weight differences of oil, water and other impurities in the produced fluid to facilitate their separation. A significant portion of the gas, water, and sediment will be removed from the produced crude using first stage separator units. The second stage of separation will often use some type of heater-treater 3 to break emulsions of water and oil. After treatment, the produced fluid will be stored in units 4, and the wastewater which was separated from the produced fluid will eventually be disposed of.

The disposal of the produced wastewater should be done in an economically feasible manner consistent with current environmental regulations, with consideration given to the particular.type and location of the operation. To meet current environmental regulation requirements on acceptable hydrocarbon levels in discharged wastewater, it may be necessary to treat produced wastewater (as well as any other wastewater, such as rain water, wash-down water, and drain water) to lower its hydrocarbon content below that normally obtained from the crude-oil separation process described above. Another important incentive for lowering hydrocarbon concentration in produced wastewater is that the wastewater, in many cases, will need to be reinjected back into the reservoir for disposal, for maintaining reservoir pressure, or for increasing recovery through water flooding. To avoid plugging and permeability reduction, the dispersed oil concentration in the produced wastewater should typically not exceed about 50 mg/l.

The basic technical challenge in separating hydrocarbons from produced wastewater is how to economically separate the micron size oil droplets and/or oil-in-water emulsions (collectively referred to hereinafter as "droplets") from the water continuous phase. These very small droplets result in significant part from the severe shearing that occurs as pressure is reduced from the wellhead through producing equipment on the surface. The severe turbulence, aggravated by gas breaking out of the solution, results in very small oil droplets or oil-in-water emulsions being left in the produced wastewater. This situation can be aggravated further when centrifugal pumps are used to move the wastewater between process vessels. Valves used to control flows can also cause shearing of droplets into smaller ones, thus making removal of the oil droplets from the produced wastewater even more difficult.

Typical primary treatment processes for the removal of oil and other impurities from produced wastewater utilize standard separation equipment such as skim tanks, skim vessels, and corrugated plate interceptors (CPI's). However, these primary treatment processes will only remove oil droplets which are about 20 microns or larger in diameter. Depending on the severity of the problem, secondary treatment using CPI's (if none were used in the primary treatment), gas floatation units, chemically-assisted flotation units, hydrocyclones, matrix/grid type coalescers, multi-media filtration processes, centrifuges and biotreatment processes may also be needed to reduce oil concentration to allowable discharge limits. Depending on which type of treatment is used, oil droplets as small as 5–10 microns may be removed.

Each of these secondary treatment processes have problems associated with their use, and none of them are cost effective or simple to operate. For example, flotation units generally do not handle rate surges or oil slugs well and they, as with centrifuges, entail high capital and operator costs along with a high degree of operator skill. Biotreatment processes are also expensive due to the cost of the microorganisms required and the associated storage problems. Additionally, none of these secondary processes are flexible because, to be cost effective, the wastewater will be pretreated using the primary equipment described above to ensure that the larger (20 microns or larger) oil droplets are removed prior to further processing with secondary equipment. For example, prior to utilizing a centrifuge, the wastewater will typically be treated with a skim tank or a CPI in order to efficiently separate the oil from the wastewater. This is done because, with most secondary treatment processes, only a fraction of the entire wastewater stream can be processed at a time. Thus, processing without prior primary treatment would be inefficient and expensive.

BRIEF DESCRIPTION OF THE RELATED ART

Acoustic energy, which is a form of mechanical vibration energy that propagates in a fluid as pressure oscillations or pressure waves, has been applied, below cavitation level, on a laboratory scale to a fluid in order to coalesce and agglomerate the particles entrained in the fluid and thus enhance the separation of these particles from that fluid. Acoustic separation, for the most part, has been limited to laboratory applications because of the difficulties associated with implementing a large scale process. Problems include determining what type and geometry of separation vessel to use and how to generate the acoustic energy (what type and arrangement of acoustic sources) within the vessel to ensure that the acoustic energy applied to the fluid does not attenuate significantly within the fluid, otherwise the coalescence of droplets will likely be inhibited. Also the application of acoustic energy should be controlled in order to avoid cavitation, which generally is the formation, growth, and implosive collapse of microbubbles in a liquid medium: The shock waves from the imploding bubbles may produce high enough shear forces to disperse or emulsify the droplets entrained in the carrier fluid. Other acoustic separation problems include contaminants (e.g., a surfactant) in the fluid which may act to inhibit coalescence of the droplets. All of these problems can be significant deterrents to both large and small scale acoustic separation.

One laboratory separation process is described in the article "Acoustic Radiation Pressure-Principles and Applications to Separation Science" (*Forstschritte der Akustick, DAGA,* pp. 19–35, 1990). In that article, Apfel states that "some experiments have been performed in the Yale Lab using flowing systems of oil drops in water in which small drops (1–50 microns) have been collected and coalesced into quite large drops (>1 cm)" and that "this observation suggests that this process may have a role in large-scale separation processes". Apfel, however, did not teach or suggest the type and arrangement of equipment necessary to implement a large scale process for separating oil from produced s wastewater or the necessary parameters for the application of acoustic energy to such a large scale process. To the contrary, Apfel indicated that there are several questions which "must be addressed if the science is to be applied fruitfully" including:

- "What geometries are conducive to continuous flow systems?"; and
- "What are the appropriate ranges of acoustic frequency and acoustic intensity for different types of particle separation, and what apparatus is most appropriate in each case?"

Apfel also did not discuss the benefits to applying acoustic energy below cavitation to a wastewater containing both large (20–150 microns) and small (1–19 microns) hydrocarbon droplets in order to enhance the coalescence of the smaller droplets with the larger droplets, thereby allowing for more efficient oil-water separation using standard first stage separation equipment: Apfel focuses on applying acoustic energy to a fluid containing only very small oil droplets in order to enlarge these small oil droplets.

Although Apfel mentions that they have used "flowing" systems, the "cells" actually disclosed in Apfel are for use in a laboratory, batch, process and not a continuous flow process (see FIG. 1 of Apfel @ p.20). There is no suggestion that these cells could be scaled-up to work in a large scale, continuous flow, separation process. Even if there were such a suggestion, it is unlikely that they could be scaled-up to work in a large scale process, such as an on-line production wastewater treatment process, because such a process typically has a very high volume of fluid (40,000 to 100,000 bbl/day/unit) needing treatment. Finally, to reiterate, Apfel's statement that there is a need for exploring what type of geometries are conducive to continuous flow systems suggests that the cells he actually discloses were not intended for a scaled-up process.

Another laboratory process is described in an article by Tolte and Feke entitled "Separation of Dispersed Phases from Liquids in Acoustically Driven Chambers" (*Chemical Engineering Science,* Vol. 48, No. 3, pp. 527–540, 1993). This article discusses applying acoustic energy, on the laboratory scale, to separate water-in-olive oil emulsions from pure olive-oil having no additives or contaminants which could inhibit coalescence. The focus of this article is on the design and operation of a laboratory separation "cell" which utilizes an acoustic field to separate water from pure olive oil. The separation cell consists of one source transducer bonded to one end of a glass or an aluminum tube (up to 4 cm in diameter and 25 cm in length, and ranging from 0.9 to 2 mm wall thickness) and one reflecting transducer bonded to the other end of the tube. In the laboratory application, acoustic energy was applied to the olive-oil carrier fluid within the cell to trap water-in-olive oil emulsions, which were then moved to either end of the cell and removed through an exit port. This cell would be difficult to adapt to a large scale operation because it has an acoustic source mounted on one end and a reflector mounted on the other end, which will allow only a very small amount of fluid to be processed. For a large volume (over 15,000 bbl/day), continuous flow process, the cell, and thus the transducer and reflector, would have to be very large. In any event, there is no suggestion of using the Tolte and Feke process for either a large scale separation or for separating oil from production wastewater, which often contains impurities which can inhibit separation.

U.S. Pat. No. 2,257,997 issued to R. E. Barnes describes a method for separating residual water from crude oil using ultrasonic vibrations. The Barnes method utilizes a quartz crystal vibrator which is placed between two electrodes and is supported on the bottom of a closed vessel. The water-in-oil emulsion is passed through a conduit connected to headers at either end of the vessel. The conduit is adjacent to one or more of the vibrators, and water separated from the crude oil is removed by settling. The problem with this process is the likelihood that the acoustic intensity applied will attenuate in the crude oil host fluid because of its high viscosity. As a result, the separation of the residual water actually achieved will likely be hindered. Furthermore, Barnes does not teach or suggest applying this method to the on-line separation of oil from production wastewater nor the benefits of applying acoustic energy to enhance the coalescence of the smaller oil droplets with larger oil droplets prior to separation with standard first stage wastewater treatment equipment.

In U.S. Pat. No. 4,339,247 issued to Faulkner et, al., an acoustic degasification process and apparatus are used for separating dissolved gases from hydropressured or geopressured liquids. The apparatus used is a hollow chamber, through which the liquid containing the dissolved gas passes. The apparatus has acoustic transducers mounted on the outside wall for application of acoustic energy to the liquid. This process and the parameters necessary to ensure its effective use are based on a rectified defraction mechanism. With this mechanism, when acoustic energy is applied, the gas bubbles in the carrier fluid will expand and contract, and if they come into contact, they may expand into a larger bubble.

From the operating parameters disclosed in Faulkner and literature on rectified diffusion (Senapati, et al), it is believed that Faulkner's method is for degasification at intensity-levels in the range of a few watts/cm$^2$ and at frequencies in the range of 20–37 kHz, which put operation near or at the threshold for inducing cavitation in liquid media. This belief is supported by Faulkner's discussion of the complication associated with rectified diffusion in degasing applications (erosion of pipe walls that accompanies rectified diffusion whenever vaporous cavitation occurs near a solid surface)

and suggested ways to minimize the cavitation damage. It is therefore believed that the Faulkner disclosure is limited to operation at or near cavitation level.

In any event, Faulkner does not teach or suggest the use of this apparatus for anything other then degasification. Furthermore, the operation of the Faulkner apparatus is focused on controlling the rate of gas bubble growth: With an oil-in-water emulsion, the oil droplets will not grow as much as a gas bubble because oil is much more incompressible than gas. Thus the mechanism disclosed in Faulkner would not apply to a process for separating liquid hydrocarbons from wastewater at an intensity below cavitation, and Faulkner thus teaches away from such an application. Also, nowhere in Faulkner is there a teaching or suggestion that the gas-separation process or apparatus disclosed be used to separate oil from production wastewater.

In view of the foregoing background information and description of the related art, there is a need for an economically efficient method for removing and/or enhancing the removal of liquid hydrocarbon droplets from wastewater in a continuous flow, large-scale application.

SUMMARY OF THE INVENTION

The present invention relates to a continuous flow process for separating liquid hydrocarbons from wastewater by first introducing a continuous flow of wastewater into a vessel which has at least two groups of acoustic transducers to provide the energy source. The acoustic transducer groups are positioned axially along the vessel and each group comprises two transducers positioned opposite each other in the radial direction of the vessel. Acoustic energy is then applied to the wastewater in the vessel at an intensity below cavitation level and sufficient to induce at least one standing wave within the fluid. A portion of the liquid hydrocarbons are then allowed to coalesce within the vessel to a large enough coalesced droplet size to allow separation of the coalesced hydrocarbons from the wastewater using conventional equipment.

BRIEF DESCRIPTION OF THE DRAWINGS

The advantages of various embodiments of the present inventive process for separation of liquid hydrocarbons form wastewater will be better understood by referring to the following detailed description and the attached drawings.

DETAILED DESCRIPTION OF THE PREFERRED EMBODIMENTS

This invention is generally applicable to any process for separating liquid hydrocarbons from a wastewater (any aqueous based fluid). The liquid hydrocarbons in the wastewater can consist of oil droplets and/or oil-in-water emulsions (hereinafter collectively "droplets"). The wastewater may include water produced with crude oil, rain water, and washdown water and may also include wastewater from the use of test equipment or from drains and the like. The wastewater could also contain salts, suspended solids, paraffin, and corrosion inhibitors. The practice of one embodiment of this invention is described below as a method for separating hydrocarbons from oil and gas production wastewater. However, the invention should not be unduly limited to this application and can be used and modified as necessary by one skilled in the art to provide or enhance separation of oil from any wastewater (e.g., wastewater from an industrial storm water facility).

Figure 1:
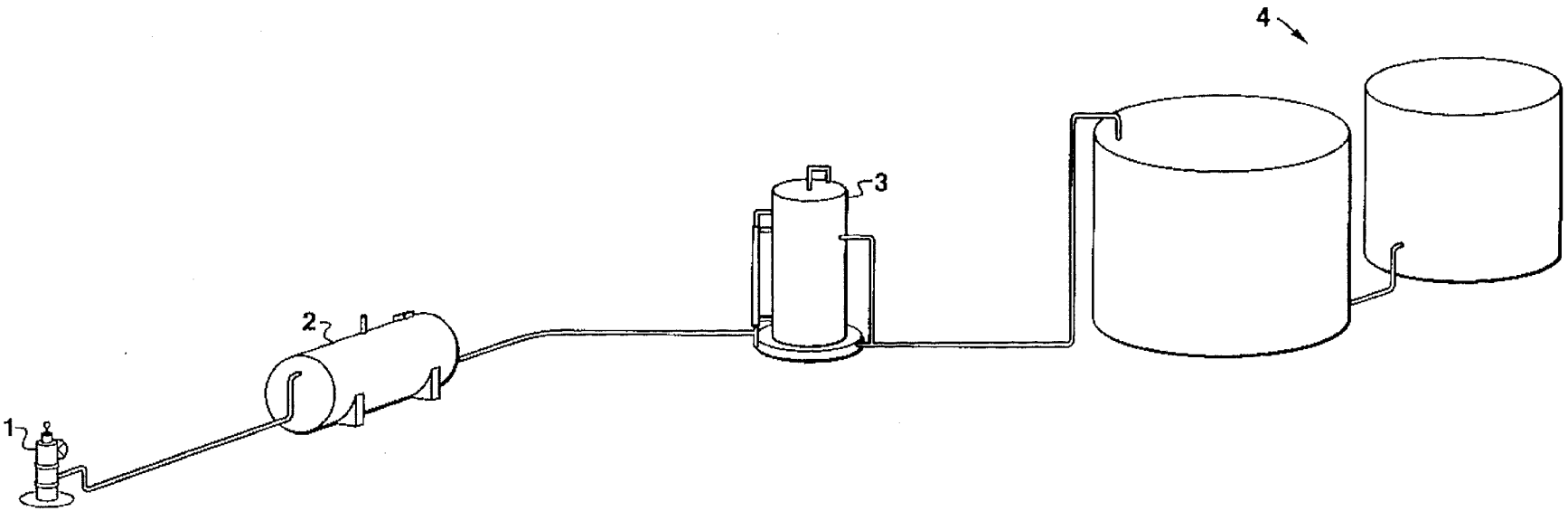
FIG. 1 illustrates a typical field processing system used in separating gas, water, sediments and other impurities from produced oil.
Figure 2:
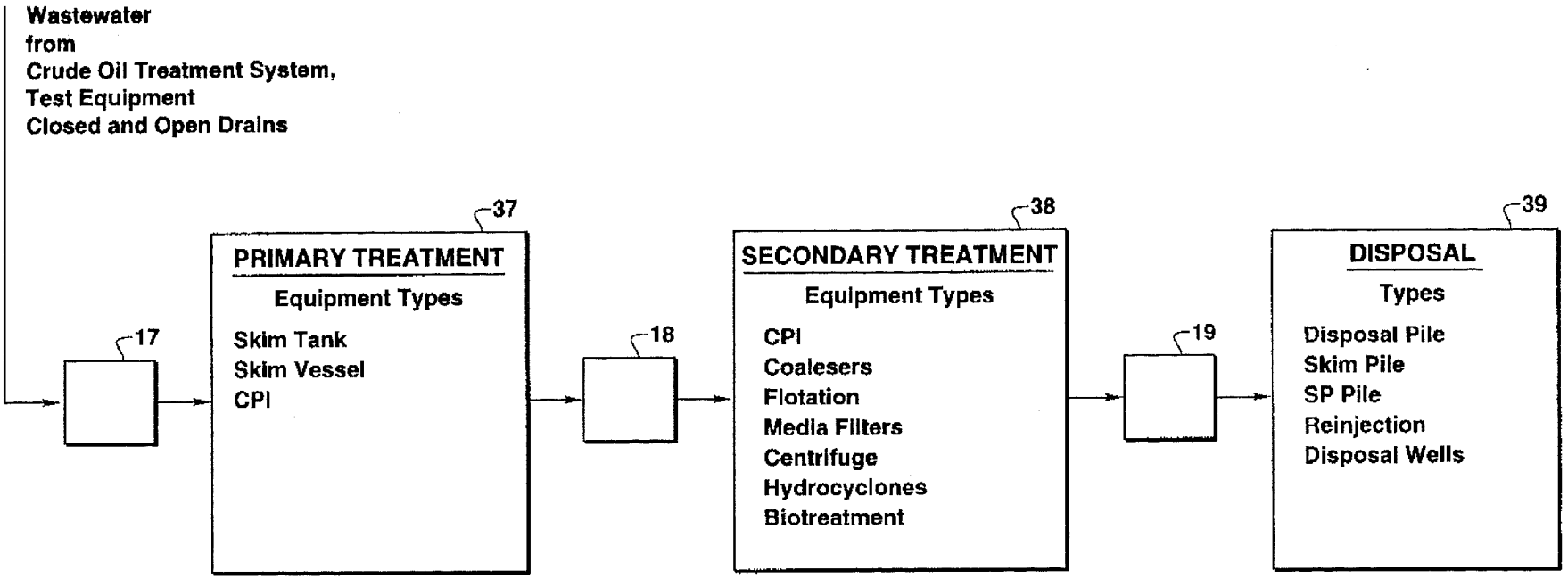
FIG. 2 is a block flow diagram which illustrates the steps and associated equipment used in removing liquid hydrocarbons from produced wastewater and several of the possible position(s) for application of acoustic energy using the process of the present invention.

FIG. 2 illustrates the steps and the associated equipment often used in processing produced wastewater from an oil and gas well and how several embodiments of the inventive process interrelate with these standard steps. As previously discussed, the wastewater removed from the produced petroleum by the initial field processing will typically still contain some hydrocarbon droplets and may therefore need further treatment prior to disposal to achieve an economically and environmentally acceptable hydrocarbon discharge concentration. This wastewater will usually have some form of primary treatment to further separate remaining hydrocarbons. As previously described, the equipment typically used in primary wastewater treatment processes are listed in box 37 and can be used to separate oil droplets (and/or oil-in-water emulsions) which are about 20 microns or larger in size. Droplet size can be determined using methods well know to those skilled in the art, such as with Malvern or Coulter Counter analyzers.

If after processing through this type of primary equipment, the oil concentration in the wastewater still exceeds the allowable environmental discharge limit, then a secondary wastewater treatment process (typically using one or more of the equipment listed in box 38) may be used in an effort to meet the discharge criteria. Current secondary wastewater treatment processes may be able to reduce the oil concentration further (5–10 microns or greater in size, depending on the equipment used), but these secondary treatment processes may be costly, difficult to operate and maintain, and are not s flexible. After primary and secondary treatment, the wastewater can be disposed of in various ways as indicated in box 39.

Figure 3B:
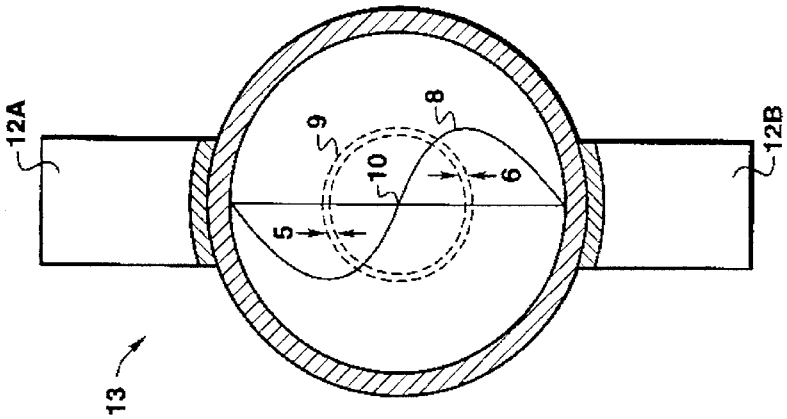
FIG. 3B is schematic end view of FIG. 3A.
Figure 3A:
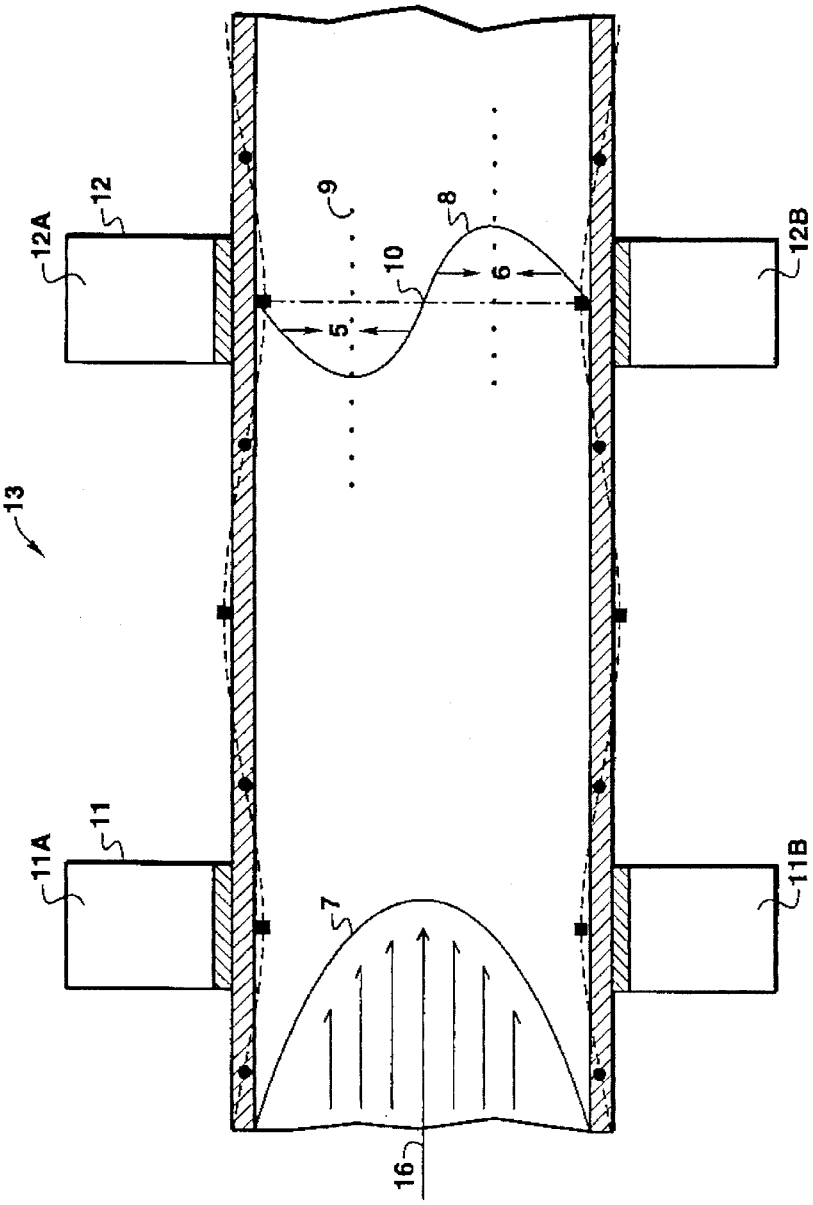
FIG. 3A is a schematic of a vessel retrofitted with two groups of acoustic transducers for use in one embodiment of the process of the present invention.

Referring now to FIGS. 3A & 3B, in one embodiment of the inventive process, a continuous flow 16 of the wastewater is flowed into a vessel 13 which has at least two groups of acoustic transducers 11 and 12 attached thereto. The vessel 13 shown in FIGS. 3A & 3B is a hollow tube, such as a pipe. Each of the acoustic transducer groups include two transducers attached to vessel 13 at axial positions and are opposite each other in the radial direction of the vessel 13. Acoustic energy is applied to the wastewater within the vessel 13 at an intensity below cavitation level and sufficient to induce at least one standing wave in the fluid. A portion of the hydrocarbon droplets are allowed to coalesce within the vessel 13, preferably to a coalesced droplet size of at least about 20 microns in diameter. The coalesced hydrocarbons can then be separated from the wastewater using conventional equipment.

As indicated by the position of box 17 in FIG. 2, the application of acoustic energy can also be a pretreatment step to enlarge oil droplet size before the fluid enters conventional primary treatment separation units, all of which currently tend to be inefficient for droplets less than about 20 microns. In one embodiment of the inventive process, the liquid hydrocarbons will have a droplet size of about 1.0 to about 150 microns prior to application of acoustic energy, and the majority of the resulting coalesced hydrocarbons will have a droplet size of at least about 20 microns after the application of acoustic energy.

Acoustic energy can also be applied as an integral part of the primary treatment or secondary treatment, as shown by boxes 18 and 19, and can be used with successive treatment units. In one embodiment of the inventive process, about 95 cumulative volume percent of the liquid hydrocarbons will have a droplet size of less than about 20 microns prior to application of acoustic energy, and about 50 cumulative volume percent of the resulting coalesced hydrocarbons will have a droplet size of at least about 20 microns in diameter.

Although the greatest potential use for this acoustic coalescence process is in removing smaller size oil droplets (less than about 20 microns), this technology may also be used to remove larger droplets at a lower cost by enhancing the separation efficiency of existing primary treatment. For example, one or more acoustic coalescers may substitute for skimmers in conventional primary treatment processes after application of acoustic energy. It is also possible that the inventive acoustic process may completely replace conventional secondary processes. Thus this inventive process is inherently more flexible then typical secondary treatment processes: In centrifuge, hydrocyclone, and media filter operations, there is no such flexibility. These conventional devices, which are capable of removing droplets down to about 5–10 microns, must be positioned at the end of the secondary treatment process because they are not cost effective for removal of droplets larger than about 20 microns, due in part to the low flow rates required for operation of these units.

For produced water contaminated with additives (such as emulsifiers or scale inhibitors), the surface charge imparted by a film of surfactant coating on the oil droplets will typically prevent or inhibit coalescence of the droplets due to surface charge repulsion. An additional treatment step may therefore be required prior to or along with the application of acoustic energy. For example, chemicals, such as sufactants, or an applied electric field may be used to suppress or neutralize any surface charge of the droplets prior to the application of acoustic energy.

Mechanisms

The basic mechanisms believed to cause particles or droplets in a fluid to agglomerate or coalesce when acoustic energy below cavitation level is applied to the fluid are described briefly below. Acoustic energy is a form of mechanical vibratory energy that propagates in a fluid as pressure oscillations or pressure waves. Depending on the type of fluid and the intensity and frequency at which the acoustic energy is applied, at least one standing wave having nodal and antinodal positions will result in the fluid. To achieve separation of oil from wastewater, the acoustic energy must be applied at an intensity and frequency which will prevent cavitation within the fluid. As previously discussed, cavitation can cause the oil droplets within the fluid to disperse or emulsify within the fluid rather than coalesce.

Figure 5:
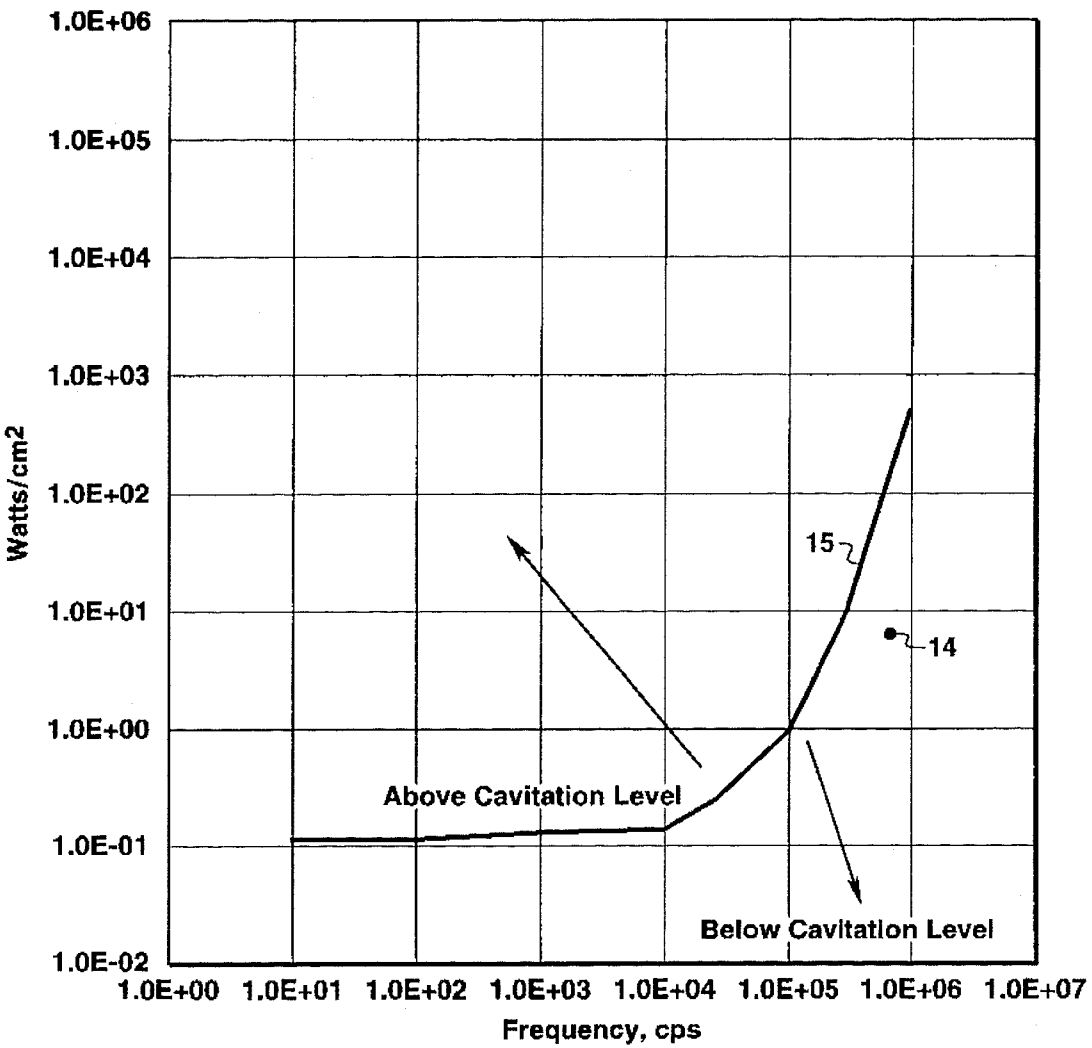
FIG. 5 is a graph which illustrates the dependence of the intensity on the frequency required to prevent or produce cavitation in water using acoustic energy.

FIG. 5 is a graph which illustrates the dependence of the intensity on the frequency required to prevent cavitation in water: To avoid cavitation in water (in an aqueous based fluid), the intensity and frequency applied should result in a position on the graph below curved line 15. The position of curved line 15 will vary depending on the concentration of dissolved gas, if any, in the aqueous based host fluid.

The primary acoustic force which will result from the acoustic energy applied is the Radiation Force "$F_r$". This force propagates in the direction of the sound wave. This force will drive droplets towards the node or antinode planes of the applied alternating acoustic field, depending on the acoustic properties of the dispersed phase. The antinodes are the positions on the standing wave of maximum pressure amplitude, and the nodes are the positions of minimum pressure amplitude. Some of the droplets will be effected by the Radiation Force and will thus follow the vibratory motion of the sound wave. But the droplets which have a cross-sectional diameter that is much smaller than the wave length of the ultrasound in the wastewater and which also have a density higher than the wastewater will remain essentially stationary with respect to the motion of the ultrasonic wave. However, as described further below, the secondary Orthokinetic and Bernoulli Forces will work to bring about droplet-droplet collisions and coalescence of these droplets to a large enough size that the Radiation Force can take effect.

The Orthokinetic Force can be described as follows. When a sound wave impinges on a suspension of droplets, it will impart a vibratory motion, or oscillation, to the droplets. Generally, the smaller droplets will follow the vibratory motion of the sound wave more easily than the larger droplets, and the intermediate sized droplets will move with intermediate velocities and phase lags. The differences in oscillation amplitude among the droplets will cause the droplets to collide and coalesce. Additionally, due to Bernoulli's effect in the constricted zone located between two droplets, the velocity of the fluid in the constricted zone will increase and the static pressure in that zone will drop. This increase in velocity and decrease in pressure will result in an attractive force between the droplets. As a result, the droplets will tend to coalesce if the attractive force due to Bernoulli's effect is higher than any repulsive force from the surface of the droplets.

Referring again to FIGS. 3A and 3B, line 8 represents the acoustic wave generated by transducers 12A and 12B. Positions 5, 6 and 10 show the nodal positions of the wave 8. This wave 8 represents, for illustrative purposes, the most simple wave form which applicants believe could be generated by the transducers 12A and 12B. The suspended droplets 9 will migrate towards antinodes 5 and 6 (as shown in FIG. 3A & 3B) or node 10 (migration to node 10 not shown in FIGS. 3A & 3B), depending on the density and compressibilty of the suspended material. Referring now to FIG. 3B, it is believed that a circular pattern of nodal and antinodal positions (as shown by the positions of droplets 9) will be created which extend radially outward from the center of the pipe 13. Standing wave 8, as previously mentioned, is shown in its simplest form, but could consist of several nodes and antinodes, in which case several rings of nodal and antinodal positions would be created. Standing wave 8 could also consist of several separate waves in phase generated by transducers 12A and 12B.

To summarize, the Secondary Othokinetic and Bernoulli's Forces will tend to cause droplets to coalesce within the standing wave field, while the Primary Radiation force will work to drive these coalesced droplets to nodal or antinodal positions. Thus although a suspension of droplets may initially consist of droplets too small to be directly effected by the Radiation force, the Orthokinetic and Bernoulli's Forces may cause the particles to coalesce to a larger size, at which point the Radiation Force will then be able to act on the droplets to move them towards the nodes/antinodes.

Acoustic Intensity/Frequency

As illustrated in FIG. 5, the acoustic intensity "I" needed to achieve a at least one standing wave below cavitation in a wastewater is a non-linear function of the frequency "f". The optimum frequency "f" can be estimated by knowing:

- that the relation between droplet size and frequency which is required to maximize the Orthokinetic Force can be determined with the following equation:

$$f=\frac{9\sqrt{3}\ \upsilon}{4000\pi R^2\rho_p} \qquad \text{(Eq. 1)}$$

where "$\upsilon$" is the viscosity of the fluid in Newton sec/m$^2$, "R", is the droplet radius in meters, and "$\rho_p$" is the density of the hydrocarbon droplet in grams/centimeters$^3$; and

- that to capture hydrocarbon droplets at nodal/antinodal positions in the pressure field, the acoustic Radiation Force $F_r$ exerted on a droplet must be greater than the vector sum of the Buoyancy Force $F_b$ and the Gravitation Force $F_g$ acting on the droplet. Accordingly, the following vector sum must exist:

$$\vec{F}_r>\vec{F}_g+\vec{F}_b \qquad \text{(Eq. 2)}$$

An example determination of the optimum frequency "f" is illustrated in the following hypothetical Example 1:

Hypothetical Example 1

Although the relative importance of the primary Radiation Force $F_r$ and the secondary Orthokinetic and Bernoulli's Forces are not well known, Applicants theorize that the Secondary forces play a very important role. The effects of these Secondary Forces should be maximized in order to maximize the effects of the Radiation Force. Recall that Secondary Forces acting on the droplets, particularly very small droplets which may not be affected by the Radiation Force, are believed to promote oscillation and collisions and thus coalescence with nearby droplets. At some point, the coalesced droplets will be large enough to be affected by the primary Radiation Force. Thus Applicants believe that the preferred method for determining the frequency and intensity is to first determine the optimum frequency for applying the acoustic energy.

As described further below, the optimum frequency "f" for droplet coalescence due to the Orthokinetic Force is believed to occur when the droplet vibration amplitude is one-half that of the fluid vibration amplitude around the droplet. The Orthokinetic Force depends on the particle size "$R^2$" particle density "$\rho_p$" and the viscosity of the fluid "$\upsilon$". These physical properties together with a radian frequency "$\omega$" of the ultrasonic vibration are used to determine the velocity of the hydrocarbon droplets relative to the velocity of the wastewater. Neglecting the gravitational force and equating the inertial force with viscous drag forces, the relative displacement or particle entrainment factor "PEF" between hydrocarbon droplets and wastewater can be determined using the following equation:

$$PEF=\frac{1}{\sqrt{1+\left(\omega\rho R^2\frac{2}{9\upsilon}\right)^2}} \qquad \text{(Eq. 3)}$$

In most suspensions, the hydrocarbon droplets well differ in size over a wide range. For very small particles, the PEF will equal one and the particles will move with the sound wave. But as particle size increases, the PEF decreases. Therefore, in order to maximize the number of collisions between the droplets, it is believed that the sound frequency f should be selected to yield a particle entrainment factor PEF of 0.5. Substituting 0.5 in Equation 3 and solving for $\omega$, the radian frequency, yields Equation 4 where $\omega$ is related to the particle size, particle density, and the wastewater viscosity as follows:

$$\omega=\frac{9\sqrt{3}\ \upsilon}{2R^2\rho_p} \qquad \text{(Eq. 4)}$$

Given that the radian frequency $\omega$ is related to frequency f by the equation $\omega=2\pi f$, and then solving Equation 4 for f yields Equation 1 for the optimum frequency:

$$f=\frac{9\sqrt{3}\ \upsilon}{4000\pi R^2\rho_p} \qquad \text{(Eq. 1)}$$

Assuming the produced fluid to be processed has a mean oil droplet radius of 1.5 microns ($1.5\times10^{-6}$ meters), a fluid viscosity of 0.001 Newton sec/meters$^2$, a droplet density of 0.83 grams/cc, then using Equation 1, the estimated optimum frequency "f" for maximizing the Orthokinetic Force is 680 kHz. Generally, to maximize the Orthokinetic Force for a mean droplet size between 1 and 20 microns, acoustic frequencies should vary from around 20 kHz to around 1 MHz. It should be noted that attenuation of acoustic intensity may be a problem at high acoustic frequencies, particularly with high viscosity fluids.

This estimated optimum frequency value f can then be used to estimate the Radiation Force $F_r$ acting on the droplets. The Radiation Force can be approximated by the following equation:

$$F_r=4\pi EkR^3\left[\frac{\rho_p+\frac{2}{3}(\rho_p-\rho_f)}{2\rho_p+\rho_f}-\frac{1}{3}\left(\frac{C_f^2\rho_f}{C_p^2\rho_p}\right)\right]\mathrm{Sin}(2kx) \qquad \text{(Eq. 5)}$$

This equation represents a time-averaged one-dimensional Radiation Force acting on a compressible sphere a distance "x" from a pressure antinode in a nonviscous fluid. "E" is the acoustic energy per unit volume of the sound field in Joule/m$_3$: The time-averaged acoustic energy density for a plane wave traveling in one dimension is given by:

$$E=10{,}000\frac{I}{C_f}\ ; \qquad \text{(Eq. 6)}$$

where: "I" is the acoustic intensity below cavitation level in watt/cm$_2$; $C_f$ is the compressional sound velocity in the wastewater in m/sec; and "10,000" is the conversion factor to yield "E" in Joule/m$^3$. Referring back to Equation 5, "k" is the wave number given by the following:

$$k=\frac{2\pi}{\lambda}=\frac{2\pi f}{C_f}\ ; \qquad \text{(Eq. 7)}$$

where "$\lambda$" is the wave length and "$C_p$" is the compressional sound velocity in the droplet in meters/second. "R" is the radius of the droplet in meters and $\rho_p$ and $\rho_f$ are the mass density of the droplet and the wastewater in g/cm$^3$. The factor in the square brackets in Equation 5 controls whether the entrained droplets are directed toward the nodes or antinodes of the standing wave, depending on the density and the compressibility differences of the droplets and the wastewater.

For example, considering the same 1.5 microns radius oil droplets with a specific gravity $\rho_p$ of 0.83 g/cm$^3$ and a compression sound velocity $C_p$ in the droplet of 1000 m/sec in a 680 kHz standing wave in a produced wastewater ($\rho_f$=1.035, $C_f$=1531 m/sec) with acoustic energy E of 45.7 Joules/m$^3$, then the maximum Radiation Force [i.e. when the maximum Sine function=1=sin(2kx)] acting on each droplet is estimated to be $3.81\times10^{-7}$ dynes.

The Buoyancy and Gravitational Force "$F_{BG}$" acting on the droplet can be approximated by the following equation:

$$F_{BG}=|980\ V_o(\rho_f-\rho_p)|; \qquad \text{(Eq. 8)}$$

will yield a point 14 on FIG. 5 which is well below the cavitation threshold line 15.

Therefore, assuming an acoustic intensity "I" of 7 watts/cm$^2$, then:

$$\frac{|F_r|}{(|F_g|+|F_b|)}=141. \qquad \text{(Eq. 9)}$$

This satisfies the oil droplet trapping criteria set forth in the Equation 2: The acoustic Radiation Force $F_r$ exerted on the droplet is greater then the vector sum of the Buoyancy Force $F_b$ and the Gravitational Force $F_g$ acting on the droplet.

TO summarize the example, the forces on micron and submicron size hydrocarbon droplets suspended in production wastewater due to high frequency elastic waves in the wastewater were calculated using the following equations:

| | |
|---|---|
| $R = 1.5 \times 10^{-6}$<br>$\rho_p = 0.83$<br>$\rho_f = 1.035$ | Radius of the droplet in meters.<br>Density of the droplet.<br>Density of the fluid. |
| $M = 4\pi\left(\frac{R^3}{3}\right)\rho_p \times 10^6$<br>$M = 1.17 \times 10^{-11}$ | Mass of the droplet in grams. |
| $C_f = 1531$<br>$C_p = 1000$<br>$f = 680000$<br>$I = 7$ | Velocity of sound in water in m/sec.<br>Velocity of sound in the droplet.<br>Frequency of sound/ultrasound cycles/sec.<br>Intensity in watts/cm$^2$. Note in FIG. 5 that the ultrasonic cavitation threshold (line 15) increases with frequency, (e.g., at 20 kHz, the ultrasonic cavitation threshold is 1 watt/cm$^2$, and at 680 kHz, it is about 7 watts/cm$^2$ (see point 14). |
| $E = 10000\frac{I}{C_f}$<br>$E = 45.7$ | Acoustic energy density in Joules/m$^3$ |
| $CR = \frac{\rho_p + \frac{2}{3}(\rho_p - \rho_f)}{(2\rho_p + \rho_f)} - \frac{1}{3}\left(\frac{C_f^2\rho_f}{C_p^2\rho_p}\right)$<br>$CR = -0.7$ | The factor which controls whether entrained droplets are directed towards the nodes (CR > 0) or antinodes (CR < 0) of the standing wave. |
| $F_r = 4\pi R^3\left(2\pi\frac{f}{(C_f)}\right)CR\ 10^5 E$<br>$F_r = 3.81 \times 10^{-7}$ | Force on the droplet in dynes due to acoustic radiation force. |
| $F_{BG} = \|980\ V_o\ (\rho_f - \rho_p)\|$<br>$F_{BG} = 2.7 \times 10^{-9}$ | Buoyancy and gravitational forces on the droplet (in dynes). |
| $F_{RATIO} = \frac{F_r}{F_{BG}}$<br>$F_{RATIO} = 14$ | Ratio of the ultrasonic Radiation Force on the droplet and the Gravitational and Buoyancy Forces on the droplet. |

where "$V_o$" is the volume of the droplet. As calculated below, for the same droplet size, the sum of these two forces "$F_{BG}$" is $2.7\times10^{-9}$ dynes. The Radiation Force $F_r$ is then roughly 140 times the sum of the Buoyancy $F_b$ and Gravitational $F_g$ forces.

To estimate an appropriate intensity "I" given the estimated optimum frequency f of 680 kHz, calculated above, reference is made again to FIG. 5, which illustrates the dependence of intensity on frequency required to prevent cavitation in pure water. Although this Figure is for pure water, it should be a conservative estimate for the intensity value required to avoid cavitation even in wastewater having various contaminants. At an estimated optimum frequency of 680 kHz, a proposed acoustic intensity of 7 watts/cm$^2$, As previously indicated, the effects of the Orthokinetic and Bernoulli's Forces will cause small particles to coalesce to the point at which the Radiation Force becomes important and will work to move those droplets towards the nodes or antinodes. Because $|F_r|$ is proportional to the droplet size $R^3$ and acoustic intensity I, the Intensity "I" below cavitation can be varied experimentally to determine the optimum for capturing droplets at the pressure nodes/antinodes.

VESSEL

Referring now again to FIGS. 3A & 3B, the vessel 13 is shown as a hollow tube or pipe. However, the vessel 13 could be any hollow vessel which would allow wastewater to flow continuously through it at the is required production rate. For example, typical production wastewater processing rates range from around 40,000 to 100,000 bbl/day/unit, but can be as low as 1000 and as high as 150,000. These rates, and thus the size of the vessel 13 will vary according to the particular application. The vessel 13 should also be designed to withstand the operating pressure and temperature of the particular application as well as the corrosive property of the production brine or chemical additives. Those skilled in the art will be familiar with the materials which will work well for high temperature, high pressure, corrosion resistant applications (e.g., schedule 80 stainless steel pipe).

In one embodiment of the vessel 13, the acoustic transducer groups 11 and 12 each are comprised of two transducers (11A & 11B; and 12A & 12B, respectively) attached to the vessel 13 at positions opposite each other in the radial direction. Looking to acoustic transducer group 11, the transducer 11A is positioned opposite transducer 11B in the radial direction of the vessel 13. Also, the transducer groups 11 and 12 are positioned axially along the vessel 13. However, as described further below, the number of transducer groups per unit length of the vessel 13 or pipe and the number of transducers per group needed for separation of the oil from the water will vary with the amount of oil to be removed, the types of fluid, the thickness of the vessel or pipe, and the distance for the half-intensity node.

Figure 4:
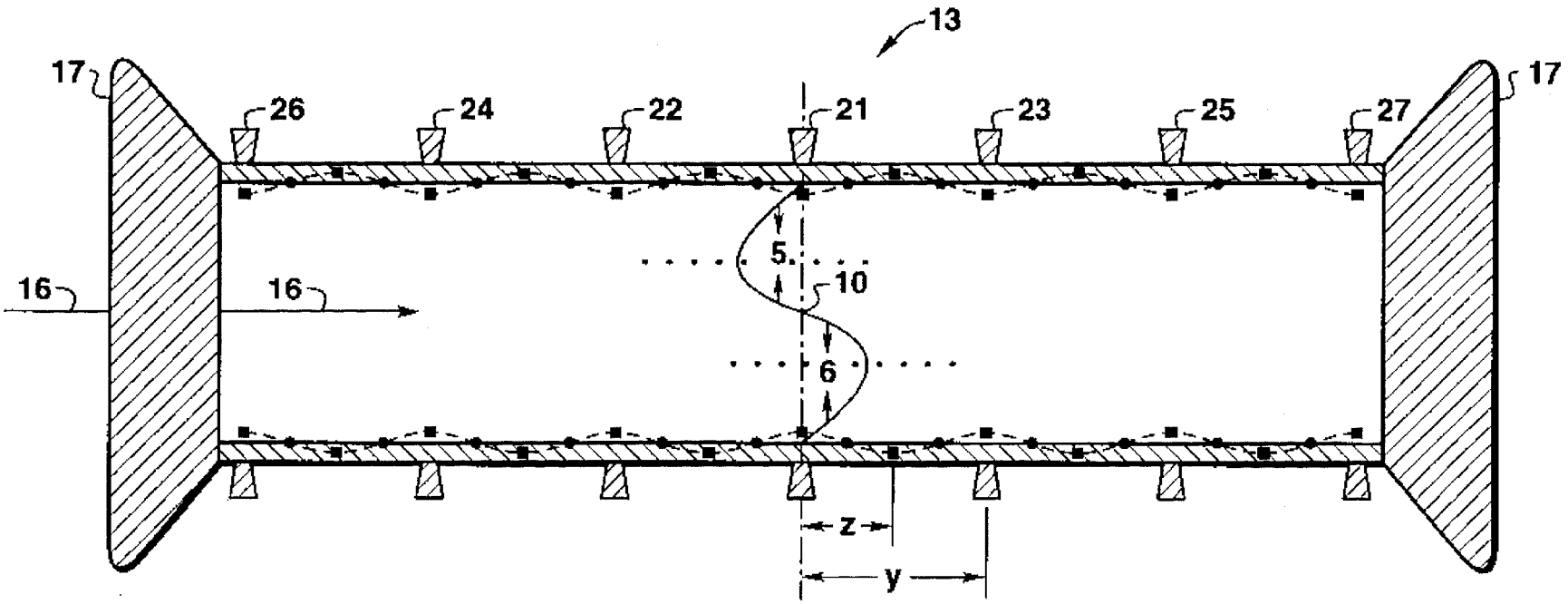
FIG. 4 is a schematic of another embodiment of the vessel having seven groups of acoustic transducers for use in the one embodiment of the process of the present invention.

The half-intensity node is the distance "z" (as shown in FIG. 4) from a transducer where the acoustic intensity generated by that transducer reaches 50% of its initial value. This value is useful in avoiding attenuation of the acoustic energy within the fluid by helping to ensure optimum placement of each transducer group. The velocity of the acoustic wave will depend on the mode of propagation and characteristic properties of the fluid medium. The depth of penetration of the acoustic wave into a medium is limited by the wave attenuation as shown by the following equation: $I_x = I_o\, e^{-\alpha x}$; where $I_x$ is the ultrasonic intensity at a distance "x" from the acoustic source; $I_o$ is the ultrasonic intensity; and $\alpha$ is the Intensity attenuation coefficent, which is a larger number for more viscous media.

Referring now to FIG. 4, the optimum position for each transducer group (21–27) can be determined experimentally by mounting the first group of transducers (group 21) at the center of the pipe 13 and then placing the remaining groups (22–27) at one or more of the maximum amplitude of vibration locations (at resonance; when transducers 12A and 12B are in phase) along the pipe 13 (shown by "■" in both FIGS. 3 & 4). In order to maintain the acoustic intensity level in the pipe 13, the placement should be an equal distance "y" (or 2Z) on either side of the center of the pipe 13. To estimate these maximum amplitude vibration locations ■, a slurry of water and clay powder can be applied to the surface of the pipe 13. The clay particles will collect at the minimal amplitude vibration locations on the pipe 13 (shown by "•" in both FIGS. 3 & 4), and the maximum amplitude vibration locations ■ will be located about halfway between two minimum amplitude vibration locations •. Each transducer in a group may consist of two piezoelectric rings commonly referred to as a "Langevin Sandwich". Each such ring is capable of producing 110 watts of power. To reduce the number of transducers in a group needed for a particular application, it is feasible that the transducers could be mounted inside the pipe or vessel, rather than on the outside.

The following hypothetical Example 2 provides more details on determining the number of transducer groups and the number of transducers needed for a particular application.

Hypothetical Example 2

For a thin wall pipe (4" ID and 4.5" OD) and low viscosity producing fluids (1.0 Centipoise), four transducers (mounted 90 degrees apart in the radial direction of the pipe) per group (only two transducers per group shown in FIG. 4) should be sufficient to generate a peak intensity near the center of a hollow pipe of 4.5 inches in outer diameter and 4 inches in inner diameter. It is anticipated that a total of seven groups of transducers will be needed for a 14 foot section of pipe assuming 1 foot half-intensity distance z, and given the following conditions:

15,000 bbl/day/vessel of produced water to be treated

Treatment time—30 seconds

Inner pipe Diameter—4 inches

Total pipe length—14 feet (including mounting elements, 17 on FIG. 4)

4 transducers per group 7 groups of transducers per 12 foot pipe

For a treatment time of 30 seconds, the total vessel or pipe volume needed is 29.3 $ft^3$. Since each pipe has a volume of 1.22 $ft^3$, a total number of 24 pipes is required to process the wastewater. These pipes can be mounted on a rack and bundled together. The pipe bundles should be designed to be rigid and self contained and should be mounted so that they expand independently so as not to impart vibration energy to the support structure. It is anticipated that each acoustic oil/water treatment unit will contain 24 pipe bundles retrofitted with transducers, with each pipe consisting of a a 14 foot section (including the mounting elements). Feed should be distributed evenly to all pipes. One group of four transducers will be mounted at antinodal locations in the same phase of the hollow pipe, and will be tuned so that they resonate at the same frequency as the pipe.

In this manner, a total of seven groups of transducers will be placed on either side of the center in the longitudinal direction of the pipe. Each transducer assembly may consist of two piezoelectric rings, where each ring is capable of producing 110 watts of power. Thus, a total power of 6160 watts can be generated and delivered to each pipe from 28 transducers or 56 piezoelectric rings. Although seven groups of four such transducers per pipe are used in this example, any number may be used depending on the properties of the fluid (e.g., viscosity), the pipe thickness, and the half intensity node distance. The type of transducer used may vary depending on the application. The length, diameter, geometry, and number of pipes can also be varied depending on other constraints such as space and maintenance requirements. This type of assembly should be easy to manufacture and maintain. It should also be easy to mount without significant modification to the wastewater treatment facility.

The optimum treatment time will vary with the initial droplet size distribution and chemical additives contained in the fluid, which may facilitate or retard the coalescence of oil droplets. Applicants believe that the treatment for a native produced water (no chemical additives) may range from seconds to minutes. More treatment volume (or pipes) may be needed if a longer treatment time is required. In this example, for a treatment of 30 seconds, the number of pipes needed to process 15,000 bbl of produced water is roughly 24. For a shorter treatment time of 10 seconds, it is possible that the number of pipes in the bundle may be reduced to 8.

As described and illustrated herein, the present invention satisfies the need for a practical method for separating liquid hydrocarbons form a wastewater. It should be understood that the invention is not to be unduly limited to the foregoing which has been set forth B for illustrative purposes. Various alterations and modifications of the invention will be apparent to those skilled in the art without departing from the true scope of the invention as defined in the following claims.

What we claim is:

1. A process for separating liquid hydrocarbons from wastewater; said process comprising the steps of:

introducing a continuous flow of said wastewater into a vessel sized to accommodate a large volume of wastewater; said vessel further having at least two groups of acoustic transducers attached thereto, wherein each of said acoustic transducer groups comprises two transducers attached to said vessel at positions opposite each other in the radial direction of said vessel; and wherein each of said transducer groups are positioned axially along said vessel;

applying acoustic energy to said wastewater within said vessel at an intensity below cavitation level and sufficient to induce at least one standing wave within said wastewater;

allowing a portion of said liquid hydrocarbons to coalesce within said vessel; and separating at least a portion of said resulting coalesced hydrocarbons from said wastewater.

2. The process of claim 1 wherein said liquid hydrocarbons in said wastewater comprise oil and oil-in-water emulsions.

3. The process of claim 1 wherein said vessel is a pipe and wherein each of said acoustic transducer groups are attached to said pipe at the maximum amplitude of vibration locations along said pipe.

4. The process of claim 1 wherein said liquid hydrocarbons coalesce at at least one of said pressure antinodes of said standing wave.

5. The process of claim 1 wherein said liquid hydrocarbons coalesce at at least one of said pressure nodes of said standing wave.

6. The process of claim 1 wherein, prior to application of said acoustic energy, about 95% of said liquid hydrocarbons have a droplet size of less than about 10 microns, and wherein at least about 50% of said resulting coalesced hydrocarbons have a droplet size of at least about 20 microns.

7. The process of claim 1 wherein, prior to application of said acoustic energy, said liquid is hydrocarbons have a droplet size in the range of about 1.0 microns to about 150 microns, and wherein a majority of said resulting coalesced hydrocarbons have a droplet size of at least about 20 microns.

8. The process of claim 1 further comprising, prior to the application of acoustic energy, pretreating the wastewater to reduce surface charge repulsion between said droplets.

9. The process of claim 8 wherein said pretreatment step comprises adding chemical coagulants to said wastewater.

10. The process of claim 8 wherein said pretreatment step comprises applying an electric field to said wastewater.

* * * * *